Figure 1:
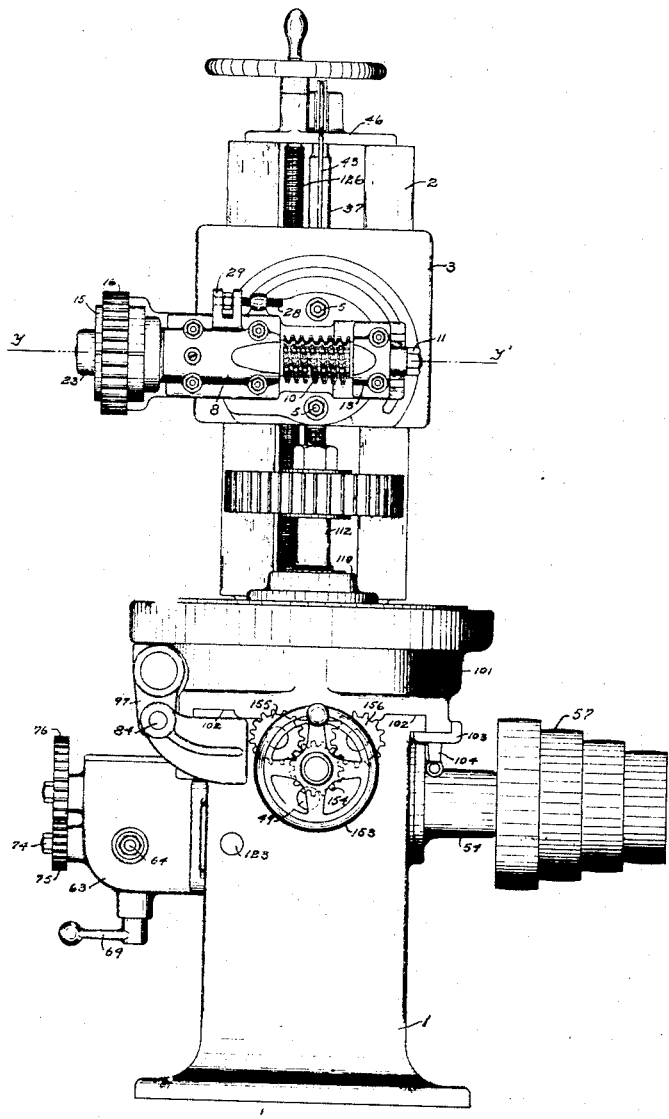

W. F. ZIMMERMANN.
GEAR CUTTING MACHINE.
APPLICATION FILED OCT. 24, 1907.

1,035,511.

Patented Aug. 13, 1912.
10 SHEETS—SHEET 6.

WITNESSES:
Edwin C. Thurston
Benjamin Nittinger

INVENTOR
William F. Zimmermann

W. F. ZIMMERMANN.
GEAR CUTTING MACHINE.
APPLICATION FILED OCT. 24, 1907.
1,035,511.
Patented Aug. 13, 1912.
10 SHEETS—SHEET 7.
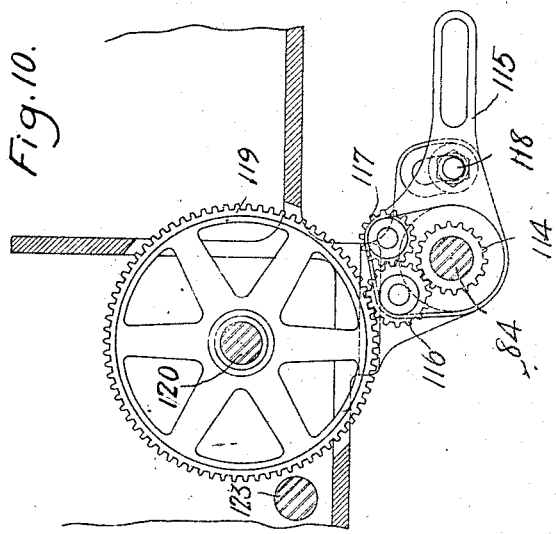
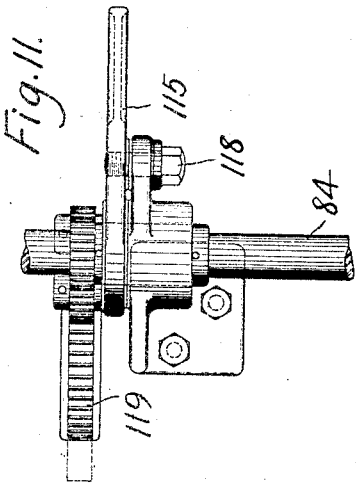
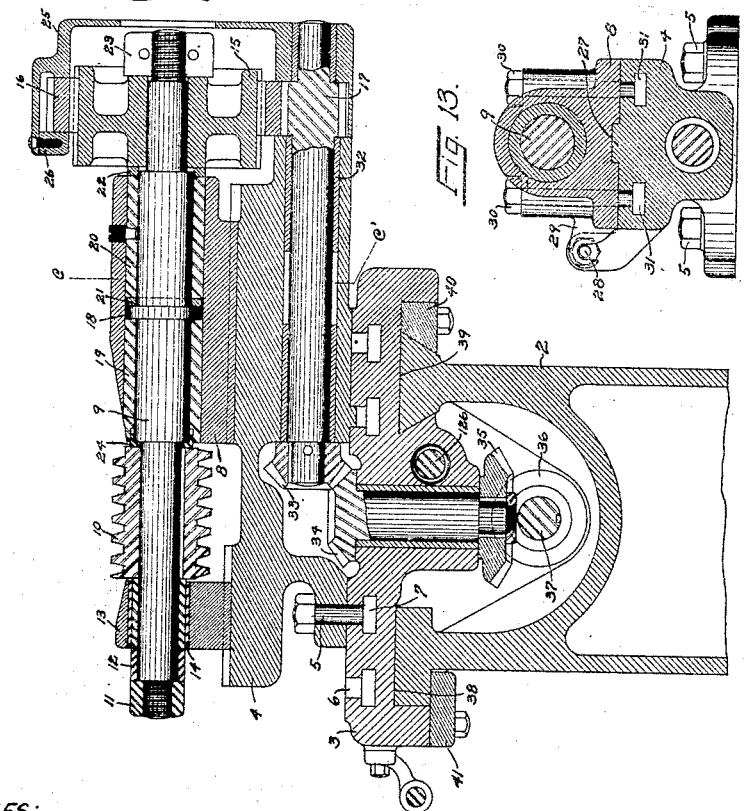
WITNESSES:
Edwin C. Thurston
Benjamin Hittinger
INVENTOR
William F. Zimmermann W. F. ZIMMERMANN.
GEAR CUTTING MACHINE.
APPLICATION FILED OCT. 24, 1907.
1,035,511.
Patented Aug. 13, 1912.
10 SHEETS—SHEET 8.
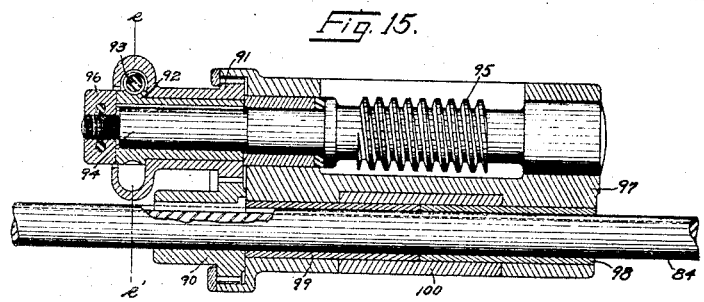
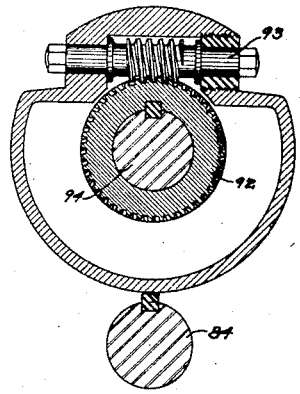
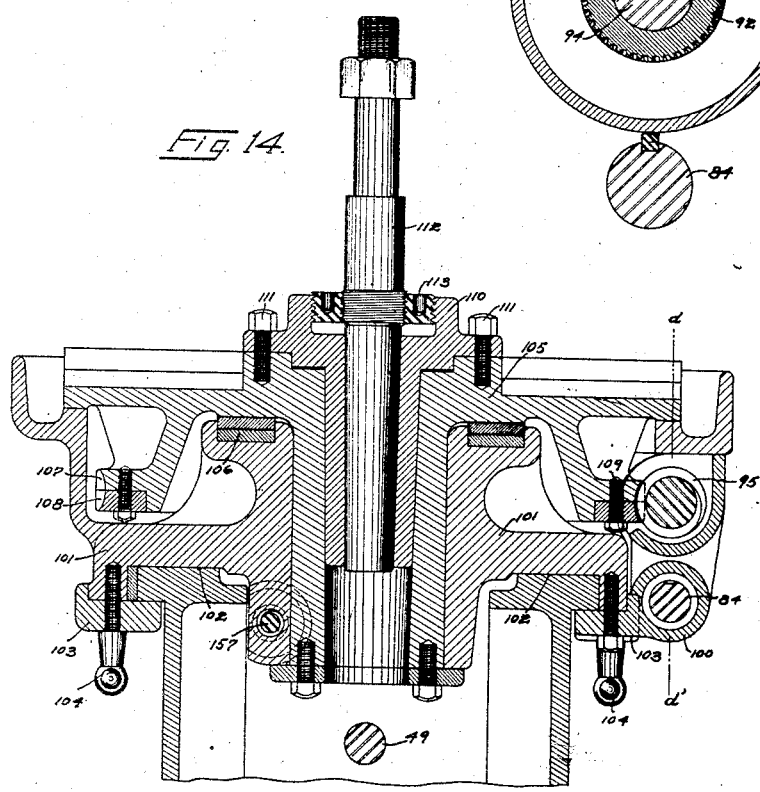
WITNESSES:
Edwin C. Thurston
Benjamin Zittinger
INVENTOR
William F. Zimmermann

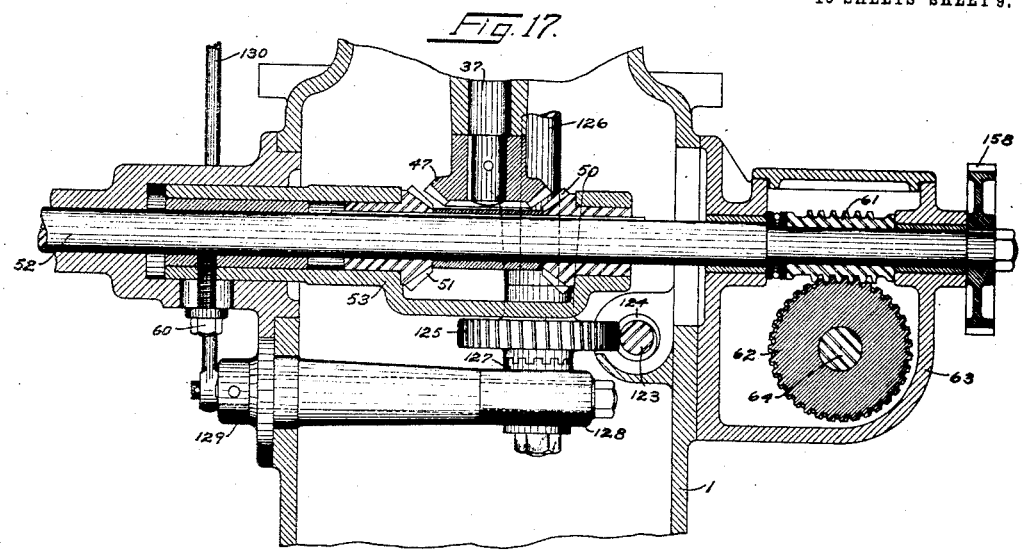
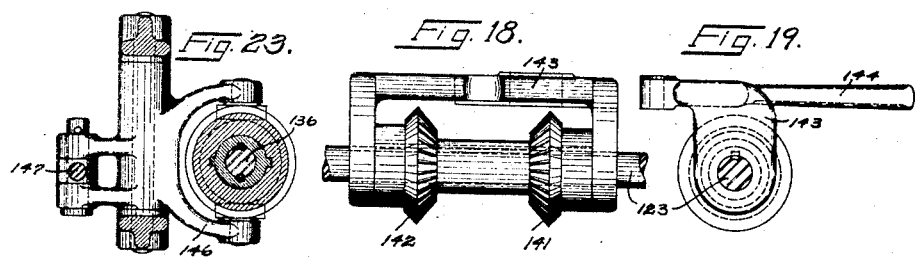
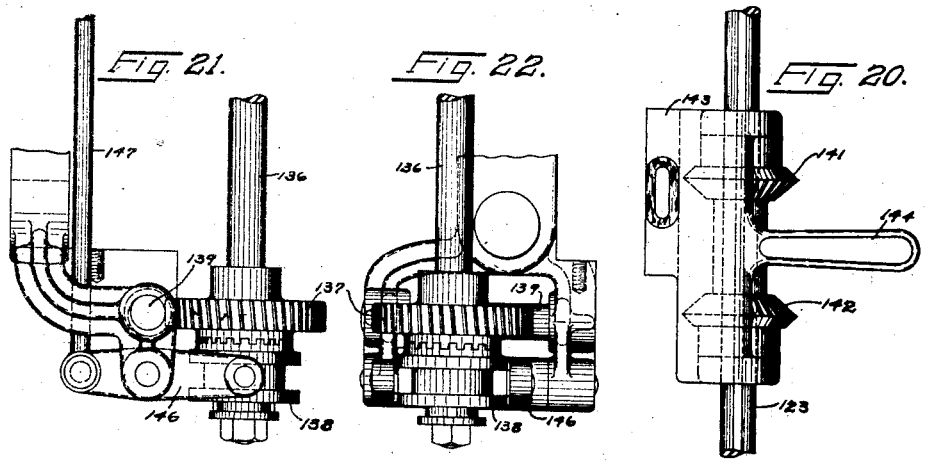

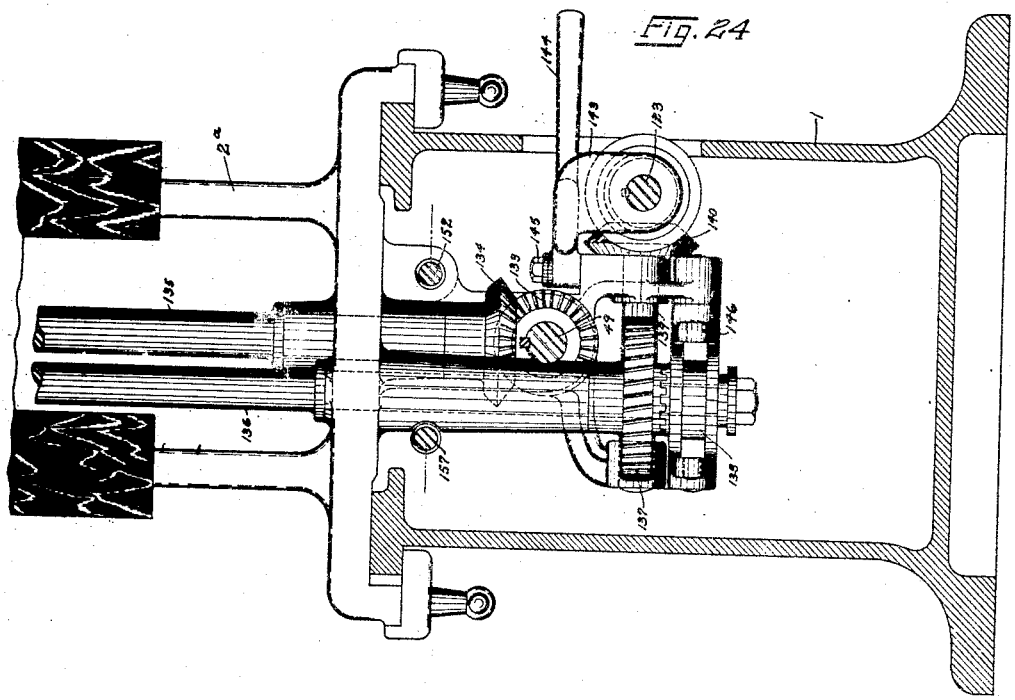
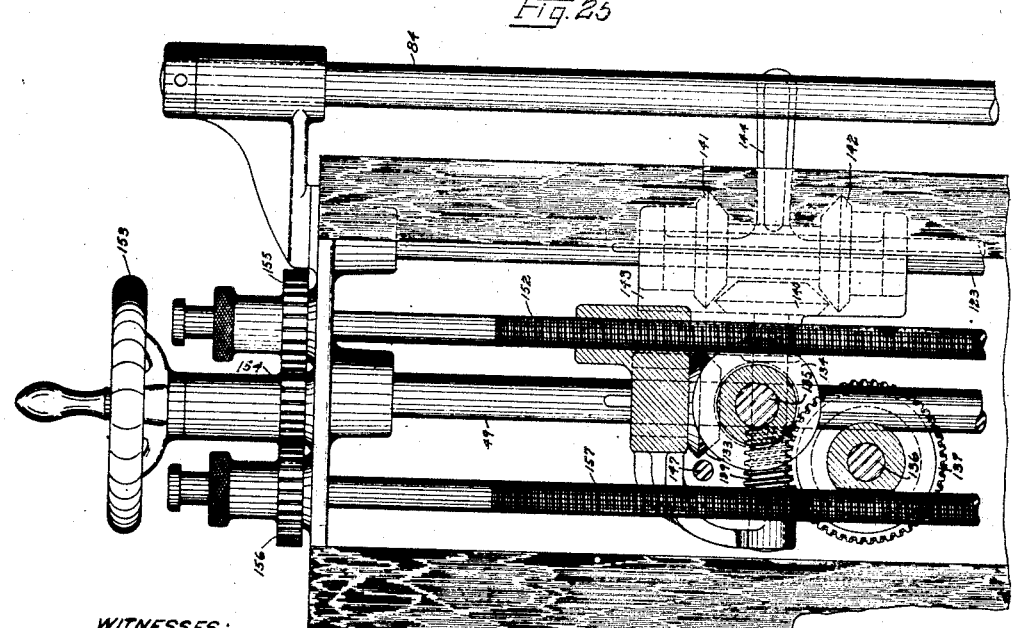

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

GEAR-CUTTING MACHINE.

1,035,511.   Specification of Letters Patent.   Patented Aug. 13, 1912.

Application filed October 24, 1907. Serial No. 399,033.

*To all whom it may concern:*

Be it known that I, WILLIAM F. ZIMMERMANN, a citizen of the United States, residing at Newark, in the county of Essex and State of New Jersey, have invented certain new and useful Improvements in Gear-Cutting Machines, of which the following is a specification.

The invention relates to machines to generate the teeth upon gear blanks, more especially to machines for generating the teeth of spur, spiral and chevron or herringbone gears with a helical or hob cutter.

It has heretofore been the custom to generate the teeth of spiral and chevron gears with a hob or helical cutter, by a structure which produces a resultant motion in either the gear blank or the helical cutter from two independent component motions, one of the said component motions controlled by the advance or feed of the cutter, and the other by the rotations of the said cutter; the two component motions substantially combined into the said resultant motion by what is known in the art as differential gearing. Further, the teeth of spiral gears have been generated with a helical cutter, by a mechanical structure based on a mathematical formula, thus eliminating the necessity of any differential gearing. For this structure an application for a patent has been filed February 18th, 1907, the serial number of which is 357,782. However, in the said application the advance of the helical cutter is controlled by the rotations of the said cutter, which has the disadvantage of the feed changing, for the different numbers of teeth, when keeping the feed change gears the same. That is, it has been found by experiment, that a given material will allow a certain amount of feed for every revolution of the said blank, which contains a given number of teeth, and if this number of teeth was increased to twice the original number in the next blank to be cut, the feed would be double the original amount per revolution of the said gear blank, if no change was made in the feed gearing. This consequently necessitates the changing of the feed for the different numbers of teeth for the same material, which requires a wide range of feeds to obtain the maximum output in all the possible cases that may arise. Or it may be stated that in the above structure for every increase of number of teeth, the feed gears remaining the same, the feed per revolution of the blank is altered. The feed per revolution being the measure of the length of feed marks on the face of the gear, determine the quality as well as the rapidity of producing the gear.

The primary object of the present invention is to provide a mechanical structure based upon a mathematical formula, whereby the teeth of the spur, spiral and chevron gears may be generated, with a helical or hob cutter, the advance of the said cutter being controlled and actuated by the rotations of the gear blanks being cut.

Another feature of the invention relates to provisions whereby the structure readily lends itself to cut the converging angles of chevron gears simultaneously with one setting of the machine, enabling the blank to be made in one piece, and thereby reducing the time to produce the said chevron gears to practically less than one half of the time consumed in the methods generally employed, which were, to cut the two angles separately and bolt them together afterward.

The structure is further applicable in that two cutters can simultaneously operate upon the teeth of spur and spiral gears at one and the same time. One of the said cutters being a trifle in advance of the other, the former cutter acting as the roughing out and the latter as the finishing cutter.

Further features of the invention relate to a quick return to the cutter, whereby the cutter is rapidly returned to its original position by power to take a re-cut. The quick return feature is especially adapted to the generating of spiral and chevron gears, when taking a recut, inasmuch as the quick return does not disturb the setting of the machines, as would be the case when returning the cutter by the hand feed wheel provided in the machine.

Other features relate to means to readily reverse the feed, whereby the helical or hob cutter can be fed in the proper direction when cutting either right or left hand gears.

The invention still further relates to a novel arrangement of compound and idler gears constituting the change gears of this structure, whereby the proper number of teeth and proper angle of the gear being cut is obtained.

Another feature relates to the construc-

the assumption being that the gear was right hand, using a right hand cutter.

The various features and combinations constituting the invention, will be readily understood from the following detail description of the structure as shown in the accompanying drawings of which:—

Figure 2:
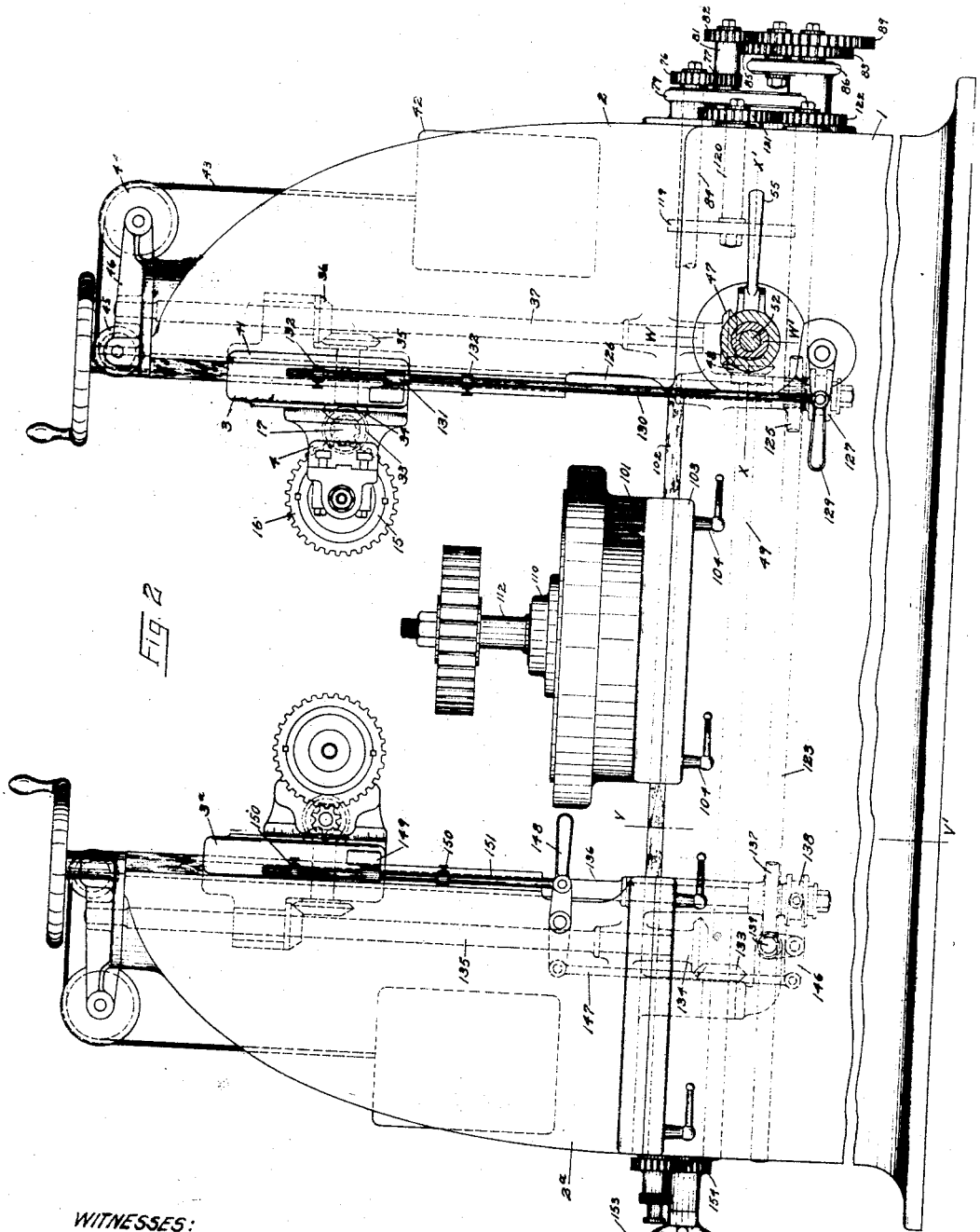
Figure 3:
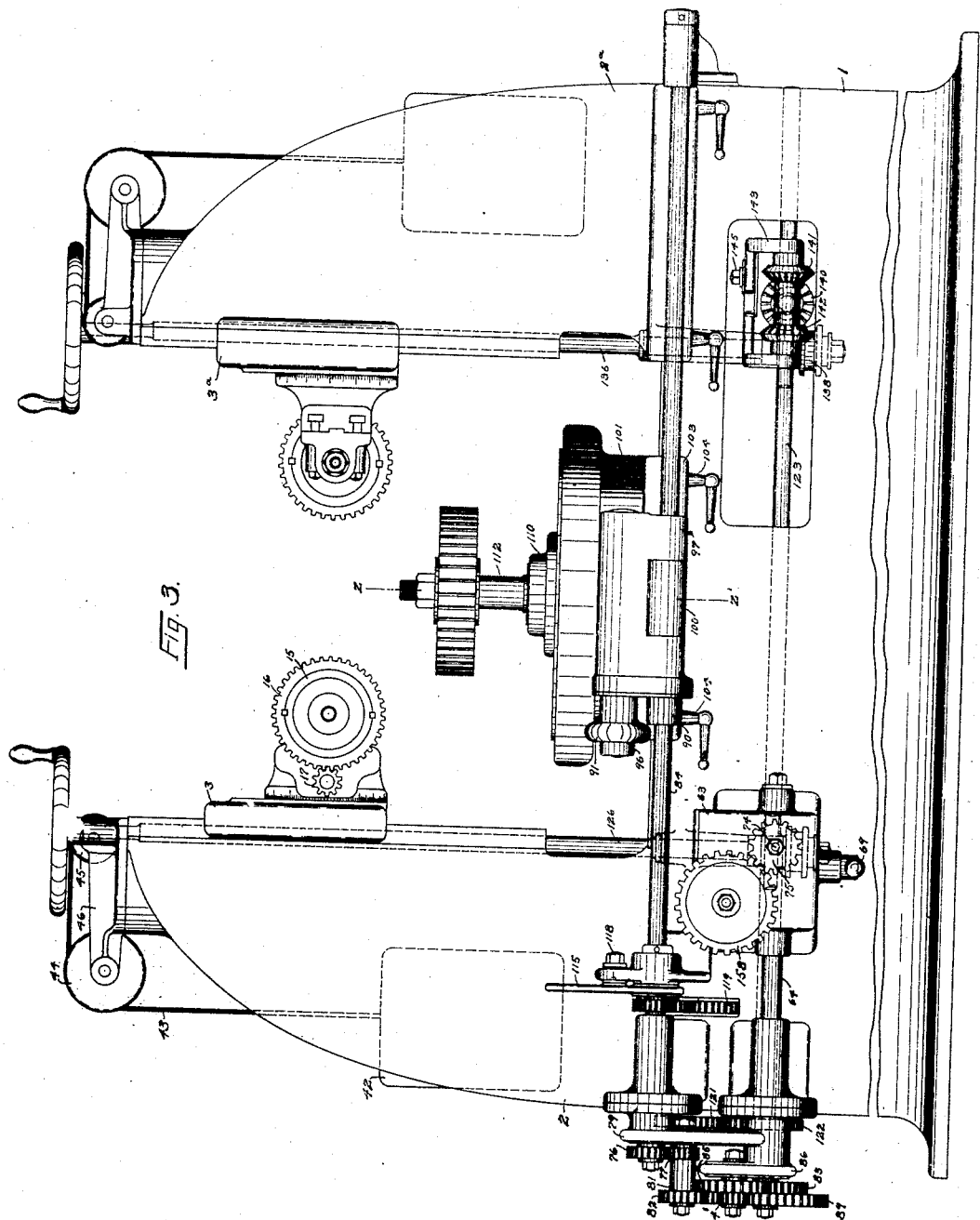
Figure 4:
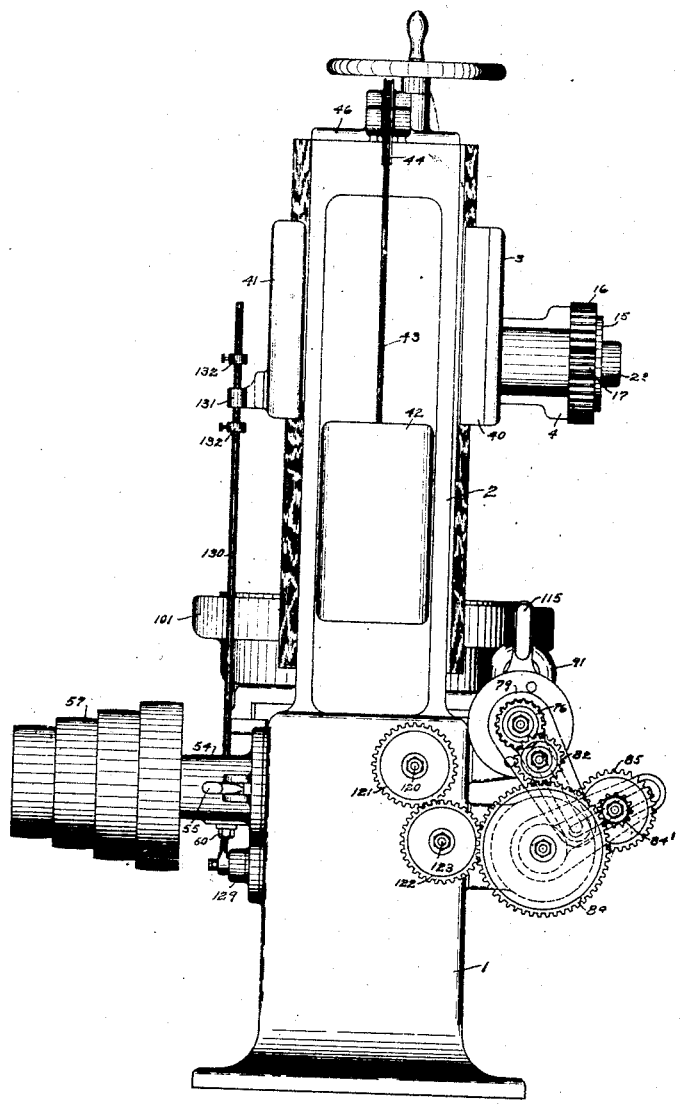
Figure 5:
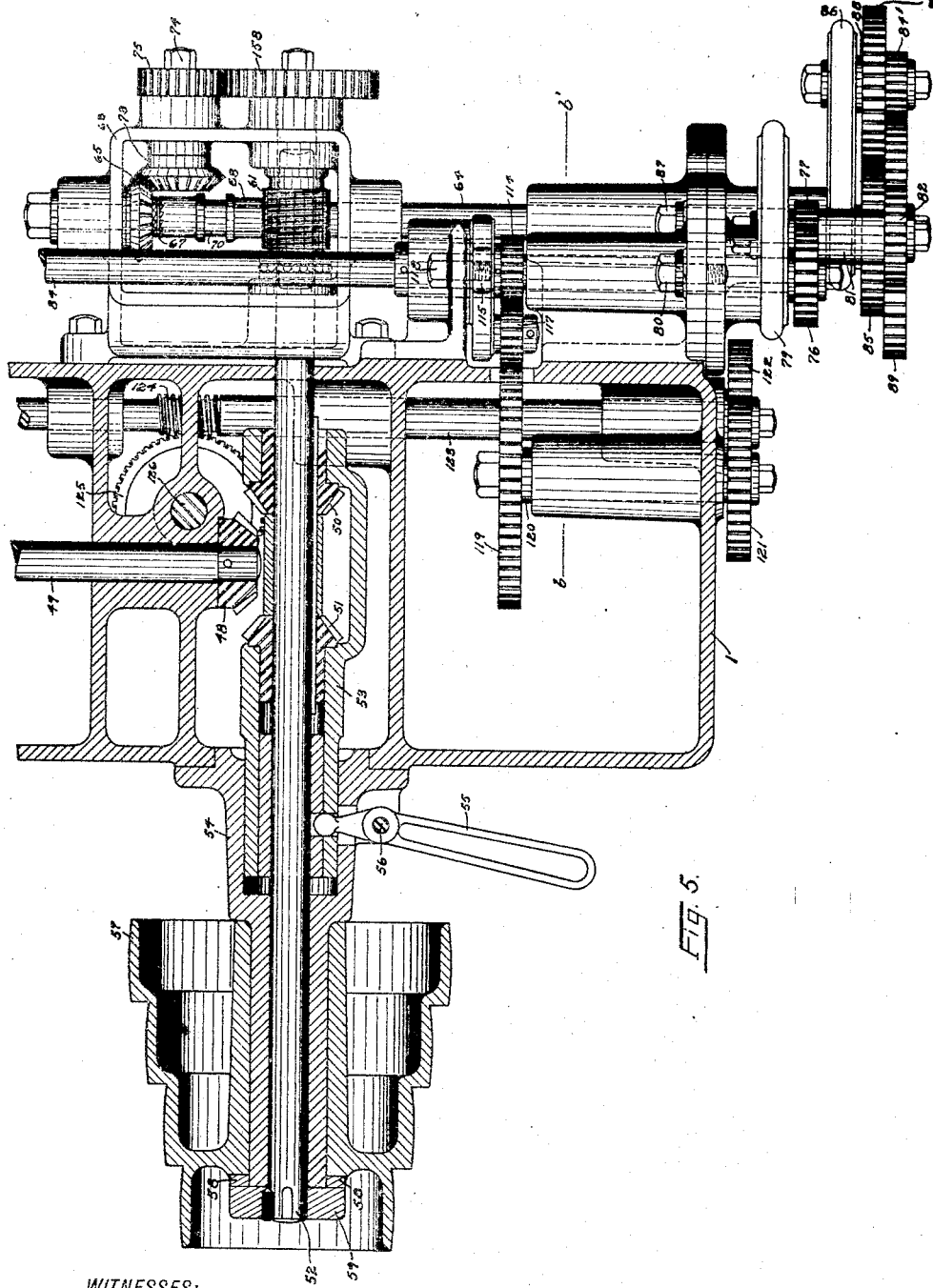
Figure 6:
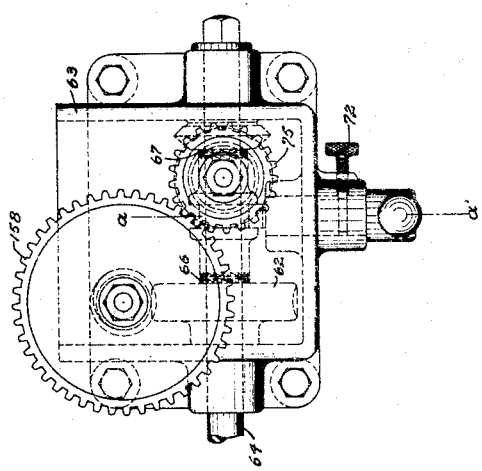
Figure 7:
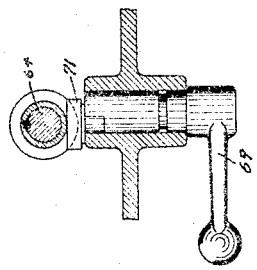
Figure 8:
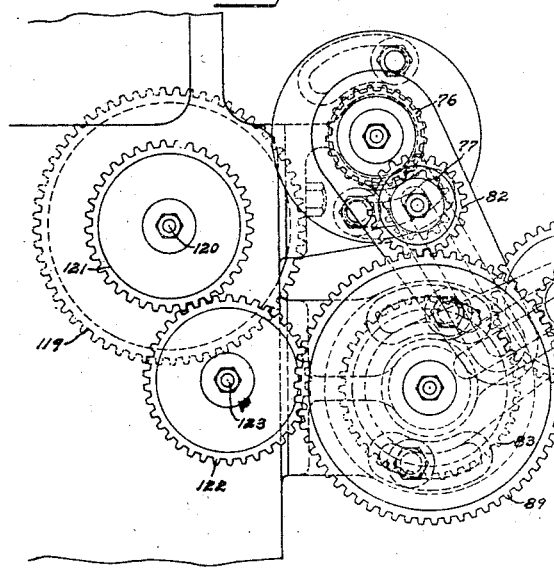
Figure 9:
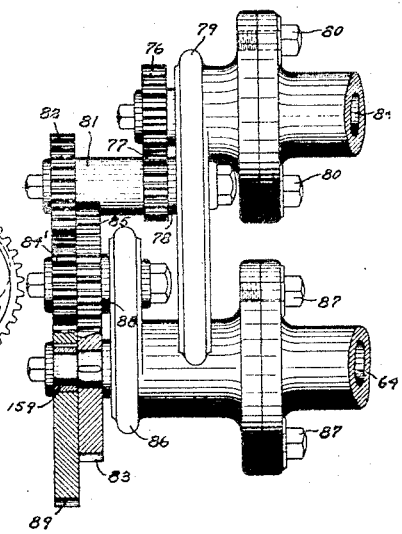

Figure 1 is a front elevation of the machine, embodying the invention, the adjustable cutter stanchion having been removed to more clearly show the cutter and its parts upon the stationary stanchion. Fig. 2 is a right side elevation with the driving cone removed to clearly illustrate the structure it would ordinarily cover, and Fig. 3 is a left side elevation of the machine, Fig. 4 is a rear elevation showing the index gears. Fig. 5 is a plan section at X X' of Fig. 2 showing clearly the cutter drive reversing mechanism, the cutter feed arrangement, the quick return to the cutter and the indexing mechanism for the blank spindle. Fig. 6 is a side elevation of the quick return mechanism shown in Fig. 5 and Fig. 7 is a section at $a\ a'$ of Fig. 6 illustrating the clutch shifting device. Fig. 8 is a rear elevation of the indexing and feed change gears, and Fig. 9 is a side elevation of the same with the gears on the lower or index driving shaft in section to clearly show their arrangement. Fig. 10 is an end section at $b\ b'$ of Fig. 5, illustrating the feed reversing mechanism, and Fig. 11 is an end elevation of the same. Fig. 12 is a section at $y\ y'$ of Fig. 1 through the cutter spindle and driving mechanism therefor, and Fig. 13 is a lateral section at $c\ c'$ of the cutter spindle shown in Fig. 12. Fig. 14 is a section at Z Z' of Fig. 3 showing the index wheel, the work table, and the carriage for the same, and the work arbor. Fig. 15 is a section at $d\ d'$ of Fig. 14 showing the index worm and the micrometer adjustment for the work spindle, and Fig. 16 is a section through the said micrometer adjustment at $e\ e'$ of Fig. 15. Fig. 17 is an end section through $w\ w'$ of Fig. 2, showing the feeding mechanism for the cutter, the main driving shaft and the cutter reversing mechanism. Figs. 18, 19 and 20 are details of the reversing gears for the adjustable stanchion cutter drive, said stanchion is located on the left end of Fig. 2. Figs. 21, 22 and 23 illustrate the feeding mechanism for the cutter on said adjustable stanchion. Fig. 24 is a section at V V' of Fig. 2 showing the cutter feeding and the driving mechanism for said adjustable stanchion. Fig. 25 is a plan view of Fig. 24 with the said adjustable stanchion removed, and also showing the adjusting mechanism for the stanchion and work slide.

Referring to Figs. 1, 2, 3, and 4 upon the base 1, and preferably in one piece with the same is mounted a stanchion 2, also a second stanchion $2^a$ slidably mounted on said base 1 and longitudinally adjustable thereon. Each of said stanchions 2 and $2^a$ have slidably mounted thereon, the cutter carriage 3 and $3^a$ respectively which are vertically adjustable.

Referring more particularly to Fig. 12 which is a section through the cutter carriages 3 and $3^a$, the slide 4 is mounted angularly adjustable upon the said cutter carriage 3 and secured thereto in its various angular positions by the bolts 5, located in the circular T slots 6 and 7; upon said angularly adjustable slide 4 is mounted a cutter support 8 longitudinally adjustable thereon. A cutter spindle 9 is rotatably mounted in said support 8; the helical cutter 10 is keyed to said spindle 9, and is rotatable therewith, and secured end-wise by the nut 11 and the collar bushing 12. The collar bushing 12, rotates in the outer support 13, and is provided with the bushing 14 fastened therein. Upon the other end of said cutter spindle 9 is keyed a driving center 15, which is slidably keyed within the spindle gear 16 which meshes with the spindle driving pinion 17. The spindle 9, is provided with a collar 18, preferably in one piece with said spindle 9, between the bushings 19 and 20 which are secured within the cutter support 8. The bushing 20 being secured to take the end thrust of the spindle 9, due to the angular pressure of the helical cutter 10, when operating upon a gear blank, the friction of said end thrust is materially reduced by the anti friction washers 21, and 22; a clamp nut 23 is provided to take up the end wear that may have resulted from the said end thrust. The spindle 9 is provided with a dust collar 24, located at the cutter end to prevent any dust or chips working their way into the spindle bearings. The said spindle gear 16 is held from lateral movement by the casing 25, and the flange 26 secured to said casing 25; the said casing 25 is bolted to the angularly adjustable slide 4. The cutter spindle 9 and its support 8 are arranged to slide longitudinally upon the slide 4 to set the helical cutter 10 centrally. The slide 4 is provided with a tongue 27 engaging a groove in the support 8, and acting as a guide; the said cutter support 8 is adjusted by means of a screw 28, which is tapped in the slide 4 and operates between the abutments 29 and is secured to the slide 8 in each of its adjusted positions by means of the T bolts 30, arranged in the T slots 31 provided in the slide 4.

The pinion 17 which meshes with the gear 16 is extended on each side and is rotatably mounted within the bushings 32 which are fastened within the slide 4. Upon one end of said pinion 17 and rotatable therewith is keyed a bevel gear 33, meshing with a long hubbed bevel gear 34 rotatably mounted within the slide 3. The bevel gear 34 is the center about which the angularly adjustable slide 4 is rotated. Keyed to the end of the hub of said bevel gear 34 and rotatable therewith is another bevel gear 35 meshing with a sleeve bevel gear 36, slidably keyed upon the vertical drive shaft 37 and adjustable therewith; the vertical drive shaft 37 connecting with the main driving mechanism as hereinafter set forth.

The cutter carriage 3 is arranged to slide vertically upon the ways 38 and 39 of the stanchion 2, and is suitably held thereto by the gib 40 and the strap 41. The cutter 10 and its slides 3 and 4 are counterbalanced by the weight 42, suspended by the cable 43 passing over the sheave wheels 44 and 45, and secured to the carriage 3. The said sheave wheels 44 and 45 are rotatably mounted in the bracket 46 which is fastened to the top of the stanchion 2. The above description of the cutter 10 and its slides, etc., on the stanchion 2, apply also to the cutter, etc. upon the stanchion 2ª, they being exact duplicates.

Referring to the Figs. 2, 5 and 17, the vertical cutter drive shaft 37 has keyed to its lower end a bevel gear 47, the upper end being mounted in suitable bearings in the bracket 46, the said bevel gear 47 meshing with the gear 48 keyed to the longitudinal shaft 49 and rotatable therewith. The said bevel gear 47 is arranged to be alternately engaged by the reversing bevel sleeve pinions 50 and 51, and driven thereby. The said reversing pinions 50 and 51 are splined to the main driving shaft 52 and are rotatably mounted within the longitudinally adjustable casing 53. The said casing 53 slides within the cone bearing 54, and is operated by means of a lever 55, fulcrumed at 56 in the cone bearing 54 and secured in its adjusted positions by the bolt 60. The main drive shaft 52 is driven by a cone 57, rotatably mounted upon the bearing 54; the outer face of said cone 57 is provided with recesses to engage with the projections upon the flange 59. The flange 59 is keyed to the main shaft 52 and is rotatable therewith, and transmits motion from the cone 57 to the main drive shaft 52. Upon the other end of said main shaft 52 is keyed a worm 61, driving the worm wheel 62 which is rotatably mounted within the quick return box 63, and also loosely rotates upon the index drive shaft 64. A bevel gear 65, rotating in the opposite direction to said worm wheel 62, also loosely rotates upon said index shaft 64 and within said quick return box 63. The worm wheel 62 and the bevel gear 65 are each provided with a series of clutch teeth upon their faces 66 and 67 respectively, which are alternately engaged by a sliding clutch member 68, operated by a lever 69, which is fulcrumed in said box 63 and engages a peripheral groove 70 by means of a clutch shoe 71, eccentrically mounted in said lever 69 and locked in its various positions by a screw 72. The bevel gear 65 meshes with the bevel gear 73 secured to one end of the short shaft 74, a spur gear 75 is keyed to the other end, which is driven by the spur gear 158 keyed to the main shaft 52 and is rotatable therewith.

Upon the end of the index shaft 84 is keyed and rotatable therewith a change gear 76 meshing with a second change gear 77, loosely mounted upon a compound stud 78, and keyed to the compound bush 81, the compound stud 78 is carried by a swinging shoe 79, revolving about the index shaft 84 as a center, and is secured in its adjusted positions by the bolts 80; keyed to the compound bush 81 is another change gear 82, arranged to engage either directly with the change gear 83 on the index drive shaft 64 or through the compound change gears 84' and 85, loosely mounted upon the stud 88, and carried by the second compound shoe 86, swinging about the index drive shaft 64 as a center and is held in its adjusted positions by the bolts 87. The said change gear 82 can also be connected to the idler change gear 89 keyed to a bushing 159 loosely mounted upon the index drive shaft 64, as shown in Fig. 9. The various combinations of change wheels and their corresponding results will be more fully explained hereinafter. The index shaft 84 extends along the side of the machine and is splined part of its length, to allow a sleeve gear 90 to be slidably keyed to it. Meshing with said sleeve gear 90 is a gear 91 loosely mounted upon the hub of the worm wheel 92 and engaging therewith by means of a worm 93 journaled in the bearings provided in the hub of said gear 91, thus making a positive connection between the gear 91 and the worm wheel 92, the latter being keyed to the index worm shaft 94 to which is secured the index worm 95 preferably in one piece therewith. The end wear of the index worm 95 is compensated for by a clamp nut 96, the worm shaft 94 is rotatably mounted in a swinging arm 97 pivoted on the trunnions 98 and 99 secured in the bracket 100 which is suitably attached to the work slide 101. The work slide 101 is adjustably mounted on horizontal guide ways 102 provided upon the main frame 1 and secured in position by the clamp plates 103, and the clamp screws 104. A circular aperture is provided in said work slide 101 to receive the shank of the circular work table 105 which is rotatably mounted therein and has its inner and outer rims supported by said slide 101 to better enable the taking of heavy cuts. Two anti-friction washers 106 are placed between the work table 105 and said slide 101 to reduce the friction when cutting a gear blank, to a minimum. Preferably in one piece with said table 105 is an index worm wheel 107 which is split, to more accurately produce the teeth therein the lower half 108 is bolted to the upper half by means of bolts 109, the said wheel 107 being driven by the index worm 95. The work table 105 is provided with a taper aperture therein, in which a tapered work mandrel coupling 110 is inserted and secured to the table 105 by bolts 111. The said coupling 110 is also provided with a taper aperture to receive the work mandrel 112 which is inserted and ejected by a differential nut 113.

The feeding of the cutter 10 parallel to the axis of the work mandrel is arranged to be operated by the index shaft 84. Referring to Figs. 5, 10 and 11 upon the index shaft is secured a spur gear 114 upon the hub of which is rotatably mounted a tumbler lever 115, carrying the tumbler gears 116 and 117, the tumbler gear 116 meshing with the gear 114 and engaging the other tumbler gear 117. The tumbler gears are used to alter the direction of the feed; the tumbler lever 115 is secured in position by the bolt 118. The spur gear 119 is keyed to the shaft 120 and arranged to be engaged by either of said tumbler gears 116 and 117. The other end of the shaft 120 is arranged to receive the change gear 121 which engages with the change gear 122, keyed to the feed worm shaft 123. The feed worm 124 preferably in one piece with the said worm shaft 123 engages the feed worm wheel 125, which is loosely mounted upon the feed screw 126 which engages a nut portion in the slide 3. The face of said worm wheel 125 is provided with clutch teeth, see Figs. 2 and 17, which are engaged by the sliding clutch 127 which is slidably keyed to the feed screw 126 and rotates therewith, deriving its motion from the feed worm wheel 125. The feed clutch is engaged by a clutch fork 128 operated manually by the lever 129 or automatically by the rod 130 attached thereto, and controlled by the abutment 131 bolted to the slide 3 and engaging the dogs 132 adjustable upon said rod 130. As stated, the cutter and slides upon the adjustable stanchion 2$^a$, and the counterbalance, therefor, are merely duplicates of the parts upon the stationary stanchion 2, to which the above description also applies.

Referring to Figs. 18 to 24, the cutter upon the adjustable stanchion 2$^a$ is driven by a bevel gear 133 splined to the horizontal shaft 49 engaging the bevel gear 134 secured to the vertical drive shaft 135 which is identical with the vertical drive shaft 37 in the stationary stanchion 2. The feed to the cutter upon the adjustable stanchion 2$^a$ is similarly driven by a screw 136 tapped in the slide 3$^a$, and receives its motion from the feed worm wheel 137, loosely mounted upon the screw 136 and having clutch teeth provided upon one face to engage with the clutch member 138 slidably keyed to the feed screw 136 and rotating therewith. The feed worm wheel 137 is driven by the worm 139 which has keyed to it, the bevel gear 140 which can be engaged by either of the feed reversing gears 141 and 142 slidably keyed upon the feed worm shaft 123. The said feed reversing gears 141 and 142 are rotatably mounted in a sliding bracket 143 operated by the lever 144 through the frame 1, and secured in position by the bolt 145.

The feed clutch 138 is engaged by the clutch fork 146 which has attached to one end the rod 147, the said rod 147 is attached to the lever 148 which can be controlled manually or mechanically by the slide 3$^a$, similar to the arrangement upon the stationary stanchion by the abutment 149 engaging one of the dogs 150 upon the rod 151, which is attached to the handle 148. The above described arrangement for driving and feeding the cutter upon the adjustable stanchion 2$^a$ is all arranged upon the lower end of said stanchion 2$^a$ and slides therewith. The longitudinal adjusting of said stanchion 2$^a$ is accomplished by a screw 152 tapped in said stanchion 2$^a$ and operated by a hand wheel 153 located upon one end of the machine. The hand wheel 153 has attached to it a gear 154 which meshes with the slidable keyed gear 155 upon the stanchion adjusting screw 152 and also with a similarly mounted gear 156 upon the work slide adjusting screw 157 which adjusts the work slide 101. The gears 155 and 156 are slidably mounted so that either the stanchion 2$^a$ or the work slide 101 can be adjusted individually or simultaneously when setting for depth or different diameters of blank.

The operation of the machine for cutting spur gears is as follows:—The blank to be cut is secured to the work mandrel 112. The helical cutter 10, is then secured to the cutter spindle 9, by the nut 11. The swivel slide 4, upon which the cutter 10 is mounted, is adjusted to an angle equal to the angle of the helices of the cutter, and secured to the slide 3. The feed gears 121 and 122, are placed upon the shafts 120 and 123 respectively according to amount of feed required. The change gears for the indexing are placed according to the formula $\frac{C}{N}$, upon the shafts 64 and 84 and the compound studs 78 and 88. One of the tumbler gears, 116 or 117, is engaged with the gear 119, upon the feed worm driving shaft 120, to feed the cutter in the proper direction. Also one of the cutter reversing gears 50 or 51, is engaged with the bevel gear 47, on the vertical cutter driving shaft 37, by means of the handle 55. The feed clutch 127 is engaged with the feed worm wheel 125 by means of the handle 129. The machine is now set to generate a spur gear. The blank spindle 112 receives its motion from the cone 57, which is coupled to the main driving shaft 52, by the flange 59. The main drive shaft 52 transmits motion to the index drive shaft 64, through the worm 61 and worm wheel 62, the said worm wheel 62 is coupled to the said index drive shaft 64, by the clutch 68. Motion is transmitted from the index drive shaft 64, to the indexing shaft 84 through the change gears placed according to the formula $\frac{C}{N}$, the spur gear 90 rotating with the index shaft 84, drives the sleeve gear 91 which is coupled to the indexing worm 95, through the adjusting worm and worm wheel 93 and 92 respectively, the said worm 95 engaging the index worm wheel 107, which rotates the gear blank to be cut.

The cutter is driven from the main driving shaft 52, through one of the sliding bevel gears 50 or 51, the proper one having been engaged as heretofore explained. The vertical cutter drive shaft 37, which is driven from the sliding bevel gears through the bevel gear 47, drives the long hubbed bevel gear 34, mounted as a center for the swivel slide 4 to revolve about, through the bevel gears 36 and 35. The said long hubbed bevel gear 34 drives the gear 33 which rotates the pinion 17. The said pinion 17, drives the cutter spindle gear 16, which rotates the cutter 10.

The feed to the cutter is operated from the index shaft 84, through one of the tumbler gears 116 or 117, connecting the gears 114 and 119, upon the shafts 84 and 120 respectively. Motion is then transmitted from the shaft 120 through the change gears 121 and 122 to the feed worm shaft 123, which drives the feed worm wheel 125, through the worm 124. The feed screw 126 is coupled to the feed worm wheel 125 by the clutch 127.

When both stanchions are employed to cut spur gears, the cutter upon the adjustable stanchion is driven by the bevel gear 47, upon the vertical cutter drive shaft 37 in the stationary stanchion. The said bevel gear 47 engages with the bevel gear 48, upon the horizontal shaft 49, which rotates the splined bevel gear 133, the said bevel gear 133 driving the vertical cutter drive shaft 135, through the bevel gear 134. The cutter mounted upon the adjustable stanchion is driven from the vertical drive 135, similar as outlined above for the opposite cutter.

The feed for the cutter upon the stanchion 2ª is driven from the extension of the feed worm shaft 123, upon which the sliding bevel gears 141 and 142, are splined. One of said sliding feed gears drives the bevel gear 140, which rotates the feed worm 139, which drives the feed screw 136, in a similar manner to the feed screw 126.

The dogs 132 and 150 are set to throw out the feed clutches 127 and 138, when the cutter has passed across the face of the gear being cut. The blank is then disengaged from the cutter and the quick return is engaged by the clutch 68. The bevel gear 65, is then driving the index drive shaft 64 from the main drive shaft through the gears 158, 75 and 73. The face of the clutch 68 which engages the face 66 of the worm wheel 62, is so arranged as to only engage in one position. This clutch being so arranged allows of the rapid return of the cutter without disturbing the setting of the indexing. If the gear blank requires another cut, the proper depth is adjusted and the feed clutches again engage and the machine again begins to operate.

For cutting spiral gears, the machine is set similar to when spur gears are cut, but with this exception, the cutter is not only set at an angle equal to the helices of the cutter, but to a still greater angle which is equal to the sum of the angles of the helices of the cutter and the spiral blank to be cut. The index change gears upon the shafts 64 and 84 are placed according to the formula $$\frac{CC'P^{NC}}{C'NP^{NC} \mp V \sin X}$$

Both stanchions can also be used to cut spiral gears, both cutters feeding in a downward direction.

Chevron gears are generated with both cutters operating upon the wheel blank simultaneously. One of the cutters is set to cut the right hand helices and is a right hand cutter; the other, to cut the left hand helices, is a left hand cutter. Furthermore, one cutter is fed downward and the other upward, it being immaterial which way either cutter is fed, it only being necessary to feed in opposite direction.

The cutter driving arrangement is so arranged that only one set of reversing gears are necessary, that is, if the cutter is rotating in the proper direction on one stanchion, the other cutter will also rotate properly. The feed necessarily requires two sets of reversing gears due to the requirement of feeding the cutters either in the same direction or in opposite directions.

Both cutters receive their proper number of rotations from one cone, and their proper feed from one set of change wheels. Furthermore, the indexing is also controlled from one source only, and that is, through the change gears connecting the shaft 64 and 84. One or two compounds can be used. When one compound is used, right hand helical gears can be cut with right hand helical cutters. Referring to Figs. 8 and 9, the compound gear 82, is directly engaged with the gear 83 upon the index drive shaft 64 when one compound is used. If, however, from the ratios obtained by the formula, it is necessary to use two compounds when cutting right hand gears, to maintain the proper direction of the shaft 84, an intermediate is inserted. When this intermediate is inserted, the change gears connect the shafts 64 and 84 as shown in the Figs. 8, where the compound gear 82 engages the idler or intermediate gear 89, said idler 89 engaging the second compound gear 84' and the compound gear 85 mounted with said compound gear 84', meshes with the gear 83 on the shaft 64.

When left hand gears are cut by left hand helical cutters and only one compound is used, it is necessary to insert an idler or intermediate to obtain the proper direction of the wheel blank. This is accomplished by engaging the compound gear 82 with the compound gear 85, said gear 85 meshing with the gear 83 on the shaft 64. When it is necessary to use two compounds for left hand gears, the proper direction is obtained without any further gears.

Having described my invention and its mode of operation, I claim as new and desire to secure by Letters Patent the following:—

1. In a gear cutting machine the combination of a main drive shaft, a cutter carriage, a cutter mounted upon said carriage and angularly adjustable thereon, reversing gears mounted upon said main drive shaft and rotatable therewith, whereby the direction of rotation of said cutter can be reversed, a feed shaft to actuate said cutter carriage, an index shaft, a spindle carriage with a spindle rotatable therein actuated by said index shaft, a train of gearing connecting said main drive shaft and cutter, a second train connecting said main drive and index shafts, a third train connecting said index and feed shafts, said trains designed to produce a fixed relative rotational ratio between said cutter and spindle and producing a feeding motion relative to the rotation of said spindle.

2. In a gear cutting machine the combination of a main drive shaft, a cutter carriage, a cutter mounted upon said carriage and angularly adjustable thereon, a feed shaft to actuate said carriage, an index shaft, a spindle carriage with a spindle rotatably mounted therein, actuated by said index shaft, a train of gearing connecting said main drive shaft and cutter, a second train of gearing connecting said main drive and index shafts, a third train connecting said index and feed shafts, comprising reversing gears, whereby the feed can be reversed, said trains designed to produce a fixed relative rotational ratio between said cutter and spindle and producing a feeding motion relative to the rotation of said spindle.

3. In a gear cutting machine the combination of a main drive shaft, a cutter carriage, a cutter mounted upon said carriage and angularly adjustable thereon, reversing gears upon said main drive shaft and rotatable therewith whereby the direction of rotation of said cutter can be reversed, a feed shaft to actuate said carriage, an index shaft, a spindle carriage, with a spindle rotatably mounted therein actuated by said index shaft, a train of gearing connecting said main drive shaft and cutter, a second train of gearing connecting said main and index shafts, a third train connecting said index and feed shafts, comprising tumbler gears whereby the feed can be reversed, said trains designed to produce a fixed relative rotational ratio between said cutter and spindle and producing a feeding motion relative to the rotations of said spindle, to produce substantially a motion in a helical line passing around the axis of said spindle.

4. The combination of an index shaft 84, and index drive shaft 64, a change gear 83 mounted on said index drive shaft 64 and rotatable therewith and a second change gear 89 loosely mounted thereon, a compound stud, compound gears 84' and 85 rotatable thereon and meshing with said gears 89 and 83 respectively, a second compound stud, compound gears 82 and 77 rotatable thereon, said compound gear 82 engaging with said loosely mounted gear 89 and said compound gear 77 meshing with a change gear 76 secured to said index shaft 84 and rotatable therewith.

5. The combination of an index shaft 84, and index drive shaft 64, a change gear 83 mounted on said index drive shaft 64, and rotatable therewith, a second change gear 89 loosely mounted thereon, a swinging shoe 86 rotatably mounted on said index drive shaft 64, carrying a compound stud 88, compound gears 84' and 85 rotatably mounted on said stud 88 meshing with said gears 89 and 83 respectively, a second swinging shoe 79 rotatably mounted on said index shaft 84 carrying a second compound stud and compound gears 82 and 77 rotatable thereon, said compound gear 82 engaging with said loosely mounted gear 89, and said compound gear 77 meshing with a change gear 76, secured to said index shaft 84' and rotatable therewith.

6. The combination of an index drive shaft, an index shaft, change gears connecting said shafts, a gear secured to said index shaft, a tumbler lever rotatably mounted on said index shaft carrying two tumbler gears one of which engages with said gear on said index shaft, a secondary shaft, a gear secured to said secondary shaft, and arranged to be engaged by each of said tumbler gears, a feed drive shaft, change gears connecting said feed drive and secondary shafts, and means for securing said tumbler lever against said rotation when either of said tumbler gears are engaged.

7. In a helical gear cutting machine, the combination with a blank spindle, of an index shaft connected therewith, a cutter shaft, a feed shaft to feed said cutter shaft substantially parallel with said blank spindle, a main shaft, driving connections between said index and main shafts, other driving connections between said cutter and main shafts, said driving connections arranged to produce a relative rotational ratio between said cutter shaft and blank spindle, a driving means connecting said index and feed shafts, said driving connections and means arranged to produce a helical line passing around the axis of said spindle, and a means to return said cutter and blank to their original position without destroying the synchronism, substantially as described.

8. In a helical gear cutting machine, the combination with a blank spindle, of an index shaft connected therewith, an angularly adjustable cutter shaft, a feed shaft to feed said cutter substantially parallel with said spindle, a main shaft, driving connections between said index and main shafts, other driving connections between said cutter and main shafts, said driving connections arranged to produce a relative rotational ratio between said cutter shaft and spindle, a driving means connecting said index and feed shafts whereby said cutter shaft is fed relatively to the rotations of said blank spindle, said relative relations combined to produce a helical line passing around the axis of said blank spindle, and means actuated by said main shaft to return said cutter and blank spindle to their original position without destroying the synchronism, substantially as described.

9. The combination of a main drive shaft, a cutter carriage, a cutter spindle angularly adjustable thereon, gearing connecting said main drive shaft and cutter spindle, an index shaft, a feed shaft to actuate said cutter carriage, gearing connecting said index and feed shafts, an index driving shaft, gearing connecting said main drive and index driving shafts comprising means to rotate said index driving shaft slowly in one direction, when feeding said cutter, with means for rapidly rotating said index driving shaft in the opposite direction, to return said cutter to its original position, and change gears to connect said index driving and index shafts substantially as described.

10 the combination of a main drive shaft, a cutter carriage, a cutter spindle angularly adjustable thereon, gearing connecting said main drive shaft and cutter spindle, an index shaft, a feed shaft to actuate said cutter carriage, gearing connecting said index and feed shafts, an index driving shaft, gearing connecting said main drive and index driving shafts comprising two oppositely rotating driving members, rotating at different speeds, a clutch to alternately connect said driving members with said index driving shaft, to slowly feed and rapidly return said cutter to its original position, and change gears to connect said index and index driving shafts substantially as described.

11. The combination of a main drive shaft, a cutter carriage, a cutter spindle angularly adjustable thereon, gearing connecting said main drive shaft and cutter spindle, an index shaft, a feed shaft to actuate said cutter carriage, gearing connecting said index and feed shafts, an index driving shaft, gearing connecting said main drive and index driving shafts comprising two oppositely rotating driving members rotating at different speeds, a clutch to alternately connect said driving members with said index driving shaft, to slowly feed and rapidly return said clutch to its original position, said clutch arranged to engage said slow moving driving member in one position only, to preserve the relative rotational ratios between said cutter and spindle and feeding means, and change gears connecting said index and indexing driving shafts, substantially as described.

12. In a gear cutting machine in combination with a main driving shaft, two oppositely disposed cutter carriages, a cutter angularly adjustable, mounted upon each of said carriages, reversing gears upon said main drive shaft whereby the direction of rotation of both cutters can be reversed, two feed shafts to actuate said carriages, an index shaft, a spindle carriage with a spindle rotatably mounted therein and actuated by said index shaft, a train of gearing connecting said main drive shaft and cutters, a second train of gearing connecting said main drive shaft and index shaft, a third train connecting said index and feed shafts, comprising reversing gears for each of said feed shafts w' reby the feed of each cutter can be individually reversed, said trains designed to produce a fixed relative rotational ratio between said cutter and spindle and producing a feeding motion relative to the rotations of said spindle, to produce substantially a motion of two helical lines passing around the axis of said spindle substantially as described.

13. In a gear cutting machine the combination with a main drive shaft of two oppositely disposed cutter carriages, a cutter mounted upon each of said carriages and angularly adjustable thereon, reversing gears upon said main drive shaft, whereby the direction of rotation of both cutters can be reversed, two feed shafts to actuate said carriages, an index shaft, a spindle carriage, a spindle rotatably mounted therein and actuated by said index shaft, a train of gearing connecting said main drive shaft and cutters, a second train of gearing connecting said main drive and index shafts, a third train of gearing connecting said index and feed shafts, said trains designed to produce a fixed relative rotational ratio between said cutter and spindle and producing a feeding motion relative to said spindle, to produce substantially a motion of helical lines passing around the axis of said spindle, substantially as described.

14. In a gear cutting machine, the combination with a main drive shaft of two oppositely disposed cutter carriages, a cutter mounted upon each of said carriages, and angularly adjustable thereon, two feed shafts to actuate said carriages, an index shaft, a spindle carriage, a spindle rotatably mounted therein and actuated by said index shaft, a train of gearing connecting said main drive shaft and cutters, a second train of gearing connecting said main drive and index shafts, a third train connecting said index and feed shafts, comprising reversing gears whereby the feed of each cutter can be reversed, said trains designed to produce a fixed relative rotational ratio between said cutter and spindle, and producing a feeding motion relative to the rotation of said spindle, to produce substantially a motion of helical lines passing around the axis of said spindle, substantially as described.

15. In a gear cutting machine, the combination with a main drive shaft of two oppositely disposed cutter carriages, a cutter mounted upon each of said carriages and angularly adjustable thereon, two feed shafts to actuate said carriages, an index shaft, a spindle carriage, a spindle rotatably mounted therein and actuated by said index shaft, a train of gearing connecting said main drive shaft and cutters comprising a common reversing means operable from said main drive shaft whereby the direction of rotation of both cutters can be reversed, a second train of gearing connecting said main drive and index shafts, a third train of gearing connecting said index and feed shafts, said trains designed to produce a fixed relative rotational ratio between said cutter and spindle and producing a feeding motion relative to said spindle, to produce substantially a motion of helical lines passing around the axis of said spindle, substantially as described.

16. In a gear cutting machine, the combination with a main drive shaft of two oppositely disposed cutter carriages, a cutter mounted upon each of said carriages and angularly adjustable thereon, a train of gearing connecting said main drive shaft and cutters, a common reversing means operable from said main drive shaft, whereby the direction of rotation of both cutters can be reversed, two feed shafts to actuate said carriages, an index shaft, a spindle carriage, a spindle rotatably mounted therein and actuated by said index shaft, a second train of gearing connecting said main drive and index shafts, a third train of gearing connecting said index and feed shafts, comprising reversing gears to individually reverse the feed of each cutter, said trains designed to produce a fixed relative rotational ratio between said cutter and spindle and producing a feeding motion relative to said spindle, to produce substantially a motion of helical lines passing around the axis of said spindle, substantially as described.

In testimony whereof I have hereunto set my hand in the presence of two subscribing witnesses.

WILLIAM F. ZIMMERMANN.

Witnesses:
 EDWIN C. THURSTON,
 BENJAMIN NITTINGER.